United States Patent
Sun et al.

(10) Patent No.: US 11,822,818 B2
(45) Date of Patent: Nov. 21, 2023

(54) MEMORY DEVICE, IMAGE PROCESSING CHIP, AND MEMORY CONTROL METHOD

(71) Applicant: Sigmastar Technology Ltd., Xia'men (CN)

(72) Inventors: Shan-Cheng Sun, Hsinchu County (TW); Hsien-Chu Chung, Hsinchu County (TW); Yi-Chieh Huang, Hsinchu County (TW)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 244 days.

(21) Appl. No.: 17/458,634

(22) Filed: Aug. 27, 2021

(65) Prior Publication Data
US 2022/0222014 A1    Jul. 14, 2022

(30) Foreign Application Priority Data

Jan. 11, 2021   (CN) .......................... 202110032082.8

(51) Int. Cl.
*G06F 3/06*     (2006.01)
*G06F 13/16*    (2006.01)

(52) U.S. Cl.
CPC .......... *G06F 3/0659* (2013.01); *G06F 3/0604* (2013.01); *G06F 3/0673* (2013.01); *G06F 13/1668* (2013.01)

(58) Field of Classification Search
CPC .... G06F 3/0659; G06F 3/0604; G06F 3/0673; G06F 13/1668; G06F 13/16; G06F 1/3275; Y02D 10/00; G06T 1/20; G06T 2200/28
USPC .......................................... 365/189.011, 222
See application file for complete search history.

(56) References Cited

U.S. PATENT DOCUMENTS

| | | | | |
|---|---|---|---|---|
| 4,357,686 A | * | 11/1982 | Scheuneman | G11C 11/406 365/233.14 |
| 4,376,988 A | * | 3/1983 | Ludwig | G11C 11/406 365/194 |
| 4,691,303 A | * | 9/1987 | Churchward | G11C 11/406 365/236 |
| 7,791,976 B2 | | 9/2010 | Rao et al. | |
| 9,032,244 B2 | | 5/2015 | Strauss et al. | |

(Continued)

FOREIGN PATENT DOCUMENTS

| CN | 108806742 A | | 11/2018 |
|---|---|---|---|
| CN | 110162385 A | * | 8/2019 |

(Continued)

OTHER PUBLICATIONS

Agrawal, Aditya, Refresh reduction in dynamic memories, 2014, University of Illinois at Urbana-Champaign. All pages. (Year: 2014).*

(Continued)

*Primary Examiner* — Michael T Tran
(74) *Attorney, Agent, or Firm* — WPAT, P.C (57) ABSTRACT

A memory device includes first memory circuits and first memory controller. The first memory controller is configured to receive a first command from a first circuitry. When the first memory controller controls a first circuit in the first memory circuits to operate in an enable mode in response to the first command, the first memory controller is further configured to control remaining circuits in the first memory circuits to operate in a data retention mode in response to the first command.

14 Claims, 7 Drawing Sheets

(56) References Cited

U.S. PATENT DOCUMENTS

| | | | |
|---|---|---|---|
| 10,482,951 B2 | 11/2019 | Tang | |
| 11,646,096 B1 * | 5/2023 | Jiang | G11C 29/76 |
| | | | 714/764 |
| 11,762,566 B2 * | 9/2023 | Grisenthwaite | G06F 3/0622 |
| | | | 711/163 |
| 2005/0190625 A1 * | 9/2005 | Matsuzaki | G11C 11/406 |
| | | | 365/222 |
| 2005/0286331 A1 * | 12/2005 | Ito | G11C 11/406 |
| | | | 365/222 |
| 2008/0201588 A1 | 8/2008 | Pyeon et al. | |
| 2008/0259699 A1 * | 10/2008 | Van Berkel | G11C 5/14 |
| | | | 365/189.16 |
| 2010/0138684 A1 * | 6/2010 | Kim | G06F 1/3225 |
| | | | 713/600 |
| 2012/0099389 A1 * | 4/2012 | Park | G11C 11/40618 |
| | | | 365/189.011 |
| 2014/0189215 A1 * | 7/2014 | Kang | G11C 11/40603 |
| | | | 711/106 |
| 2014/0241093 A1 * | 8/2014 | Lee | G11C 29/50016 |
| | | | 365/222 |
| 2014/0254298 A1 * | 9/2014 | Dally | G11C 11/40622 |
| | | | 365/222 |
| 2015/0146494 A1 * | 5/2015 | Riho | G11C 11/40622 |
| | | | 365/189.011 |
| 2015/0340080 A1 * | 11/2015 | Queru | G11C 11/40622 |
| | | | 365/222 |
| 2018/0025773 A1 * | 1/2018 | Bains | G11C 11/40611 |
| | | | 365/230.03 |
| 2018/0232207 A1 * | 8/2018 | Ichimiya | G06F 7/57 |
| 2020/0066322 A1 * | 2/2020 | Maeda | G11C 11/4074 |
| 2020/0264788 A1 * | 8/2020 | Srinivas | G06F 3/0634 |
| 2022/0276839 A1 * | 9/2022 | Ishizu | G11C 7/1006 |
| 2023/0063498 A1 * | 3/2023 | Xie | G06F 3/0679 |
| 2023/0069382 A1 * | 3/2023 | Chen | G06F 3/0652 |
| 2023/0152994 A1 * | 5/2023 | Jiang | G06F 3/0631 |
| | | | 711/154 |
| 2023/0259304 A1 * | 8/2023 | Hanna | G06F 3/0659 |
| | | | 711/154 |
| 2023/0289088 A1 * | 9/2023 | Yang | G06F 3/0679 |
| | | | 711/154 |
| 2023/0297257 A1 * | 9/2023 | Aguilera | G06F 3/0659 |
| | | | 711/144 |

FOREIGN PATENT DOCUMENTS

| | | | | |
|---|---|---|---|---|
| TW | 200845026 A | | 11/2008 | |
| TW | 201005750 A | | 2/2010 | |
| TW | 201428758 A | | 7/2014 | |
| WO | WO-2023028347 A1 * | | 3/2023 | G06F 3/0616 |

OTHER PUBLICATIONS

OA letter of the counterpart T TW application (appl. No. 109147160) mailed on Nov. 24, 2021.

* cited by examiner

MEMORY DEVICE, IMAGE PROCESSING CHIP, AND MEMORY CONTROL METHOD

This application claims the benefit of China application Serial No. CN202110032082.8, filed on Jan. 11, 2021, the subject matter of which is incorporated herein by reference.

BACKGROUND

1. Technical Field

The present disclosure relates to a memory device. More particularly, the present disclosure relates to a memory device having a power saving mechanism, an image processing chip, and a memory control method.

2. Description of Related Art

In order to achieve higher portability, a battery can be employed in an electronic device as a power source. In order to extend the use time, the power consumption of the electronic device needs to be reduced. In some related approaches, a security monitoring device uses a large amount of memory to store image data. In these approaches, after the security monitoring device is turned on, these memories are operated in an accessible operating mode. As a result, the power consumption of the security monitoring device will be high, and is thus not suitable for battery power supply.

SUMMARY

In some aspects, a memory device includes first memory circuits and a first memory controller. The first memory controller is configured to receive a first command from a first circuitry. When the first memory controller controls a first circuit in the first memory circuits to operate in an enable mode in response to the first command, the first memory controller is further configured to control remaining circuits in the first memory circuits to operate in a data retention mode in response to the first command.

In some aspects, an image processing chip includes a first image processing circuit, first memory circuits, and a first memory controller. The first image processing circuit is configured to process image data. The first memory circuits are configured to store data. The first memory controller is configured to receive a first command from the first image processing circuit, and control a first circuit in the first memory circuits to operate in an enable mode in response to the first command, and control remaining circuits in the first memory circuits to operate in a data retention mode in response to the first command.

In some aspects, a memory control method includes the following operations: controlling a first circuit in first memory circuits to operate in an enable mode in response to a first command; and controlling remaining circuits in the first memory circuits to operate in a data retention mode in response to the first command.

These and other objectives of the present disclosure will no doubt become obvious to those of ordinary skill in the art after reading the following detailed description that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with at least one circuit, and the term "circuit" may indicate an object, which is formed with one or more transistors and/or one or more active/passive elements based on a specific arrangement, for processing signals.

In some embodiments, the term "access" may indicate a data programming operation of a memory circuit and/or a data reading operation of the memory circuit.

Figure 1:
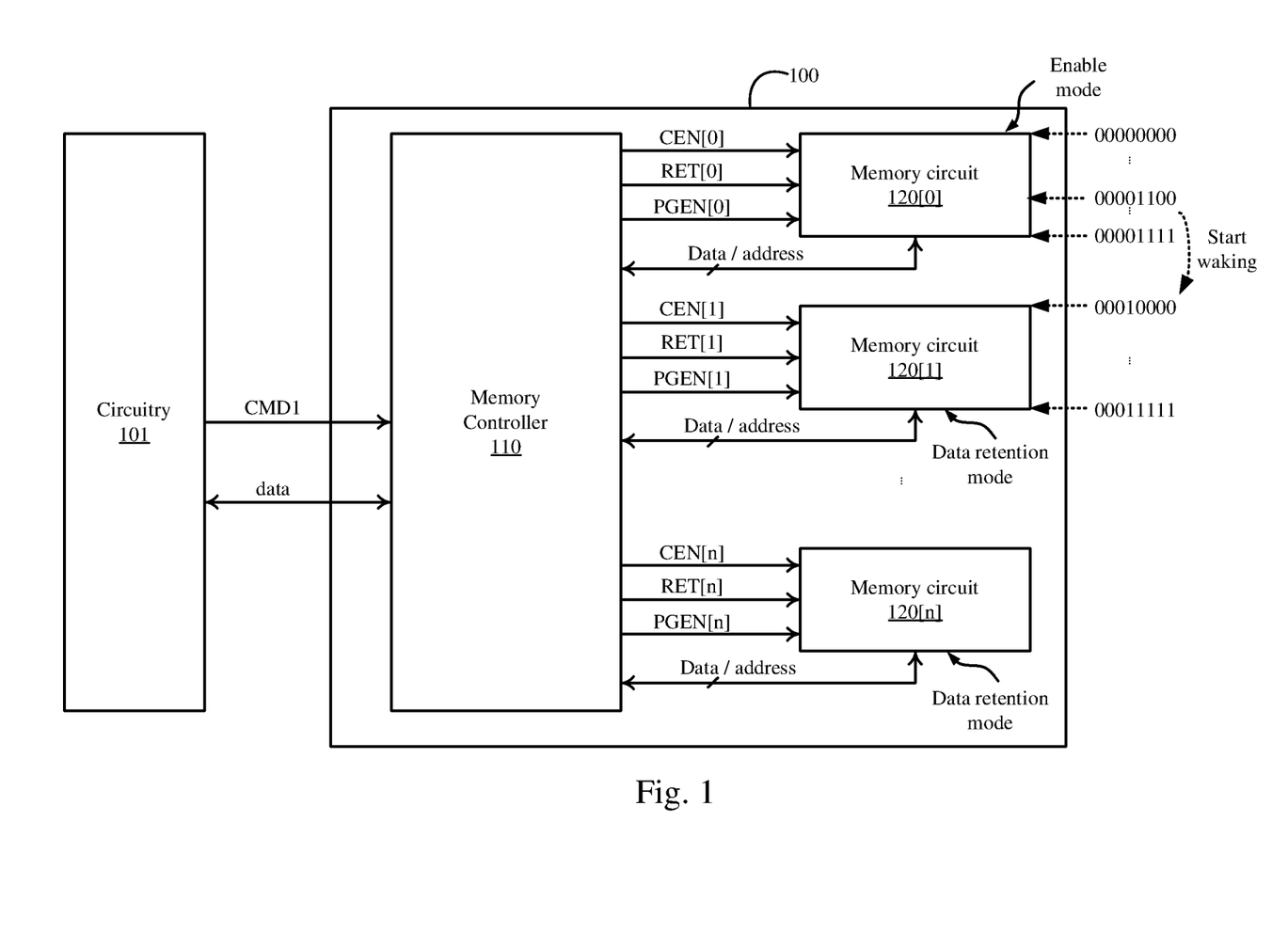
FIG. 1 is a schematic diagram of a memory device according to some embodiments of the present disclosure.

FIG. 1 is a schematic diagram of a memory device 100 according to some embodiments of the present disclosure. In some embodiments, the memory device 100 is coupled to a circuitry 101 to receive a command CMD1 and/or data from the circuitry 101.

Figure 2:
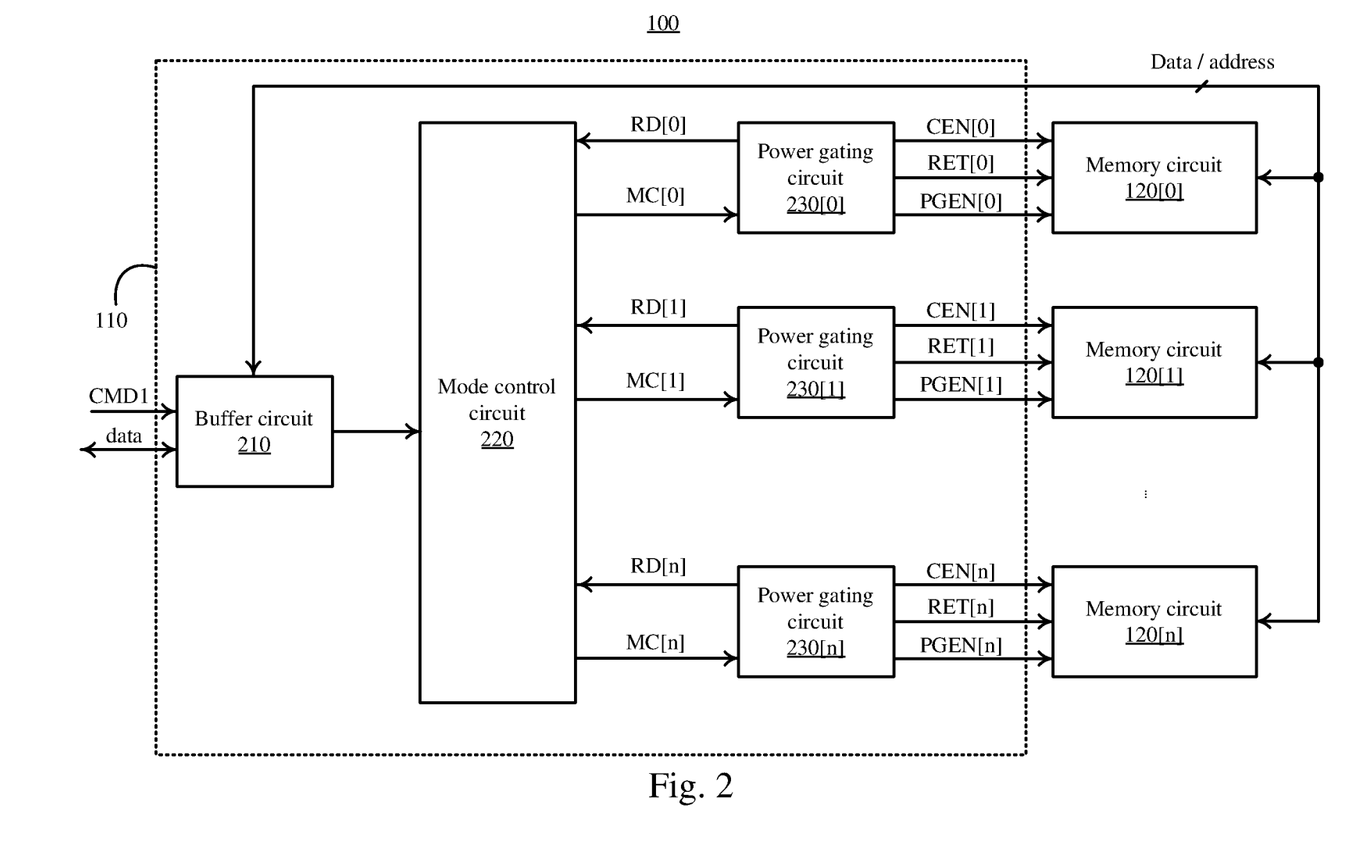
FIG. 2 is a schematic diagram of the memory controller in FIG. 1 according to some embodiments of the present disclosure.

The memory device 100 includes a memory controller 110 and memory circuits 120[0]-120[n]. In some embodiments, each of the memory circuits 120[0]-120[n] can be, but not limited to, a static random-access memory (SRAM). The memory controller 110 can receive the command CMD1 from the circuitry 101, and receive information (e.g., memory address(es), data, and so on) from the memory circuits 120[0]-120[n]. The memory controller 110 stores status signals RD[0]-RD[n] (as shown in FIG. 2), which respectively indicate operating states of the memory circuits 120[0]-120[n]. For example, each of the status signals RD[0]-RD[n] includes two bits, which can indicate that a corresponding one of the memory circuits 120[0]-120[n] is operating in an enable mode, a disable mode, a data retention mode, or the like.

The memory controller 110 can generate chip enable signals CEN[0]-CEN[n], data retention signals RET[0]-RET

[n], and power gating enable signal PGEN[0]-PGEN[n] in response to the command CMD1 to respectively control the memory circuits 120[0]-120[n]. It is understood that, as shown in FIG. 1, a corresponding one of the memory circuits 120[0]-120[n] is controlled based on a corresponding one of the chip enable signals CEN[0]-CEN[n], a corresponding one of the data retention signals RET[0]-RET[n], and a corresponding one of the power gating enable signal PGEN[0]-PGEN[n]. For example, the memory circuit 120[0] is controlled based on the chip enable signal CEN[0], the data retention signal RET[0], and the power gating enable signal PGEN[0] to operate in one of the enable mode, the disable mode, and the data retention mode. When the memory circuit 120[0] operates in the enable mode, the circuitry 101 can access the memory circuit 120[0] to read/write data and/or perform other operation(s). When the memory circuit 120 operates in the disable mode, the circuitry 101 cannot access the memory circuit 120[0]. When the memory circuit 120 operates in the data retention mode, the circuitry 101 cannot access the memory circuit 120[0], and a voltage that drives the memory circuit 120 (e.g., voltage vddc and voltage vss in FIG. 3) is switched to a minimum level that is sufficient to keep stored data. As a result, the power consumption of the memory circuit 120[0] is reduced.

In some embodiments, when the memory controller 110 controls a first circuit (e.g., the memory circuit 120[0]) in the memory circuits 120[0]-120[n] to operate in the enable mode in response to the command CMD1, the memory controller 110 controls remaining circuits (e.g., the memory circuits 120[1]-120[n]) in the memory circuits 120[0]-120[n] to operate in the data retention mode in response to the command CMD1. For example, the circuitry 101 is an image processing circuitry that outputs the command CMD1 to write image data to the memory device 100. Under this condition, the memory controller 110 controls the memory circuit 120[0] to operate in the enable mode in response to the command CMD1 (which can be a data writing command in this example) to write the image data to the memory circuit 120[0]. During the same interval, the memory controller 110 controls the remaining memory circuits 120[1]-120[n] to operate in the data retention mode in response to the command CMD1 to keep the stored data and lower overall power consumption.

FIG. 2 is a schematic diagram of the memory controller 110 in FIG. 1 according to some embodiments of the present disclosure. In some embodiments, the memory controller 110 includes a buffer circuit 210, a mode control circuit 220, and power gating circuits 230[0]-230[n]. The buffer circuit 210 is configured to receive the command CMD1, and store information (which may include, but not limited to, operations to be performed, memory address(es) to be read, and so on) carried by the command CMD1. The mode control circuit 220 can access the information stored in the buffer circuit 210 to generate mode control signals MC[0]-MC[n] that respectively correspond to the memory circuits 120[0]-120[n] in response to the command CMD1 and the status signals RD[0]-RD[n].

In some embodiments, the power gating circuits 230[0]-230[n] include registers circuits (not shown in figures), which respectively store the status signals RD[0]-RD[n] and parameters. These parameters are for generating the chip enable signals CEN[0]-CEN[n], the data retention signals RET[0]-RET[n], and the power gating enable signals PGEN[0]-PGEN[n] to control the operating mode of each of the memory circuits 120[0]-120[n]. The power gating circuits 230[0]-230[n] can generate the chip enable signals CEN[0]-CEN[n], the data retention signals RET[0]-RET[n], and the power gating enable signal PGEN[0]-PGEN[n] in response to the respective mode control signals MC[0]-MC[n], to control the operating modes of the memory circuits 120[0]-120[n] respectively. For example, the power gating circuit 230[0] can generate the chip enable signal CEN[0], the data retention signal RET[0], and the power gating enable signal PGEN[0] according to the mode control signal MC[0] to control the memory circuit 120[0] to operate in a specific mode. In some other embodiments, the mode control circuit 220 can include register circuits (not shown in the figures), which can be configured to store the status signals RD[0]-RD[n]. In other words, according to different arrangements, the status signals RD[0]-RD[n] can be stored in the power gating circuits 230[0]-230[n] or the mode control circuit 220.

Figure 3A:
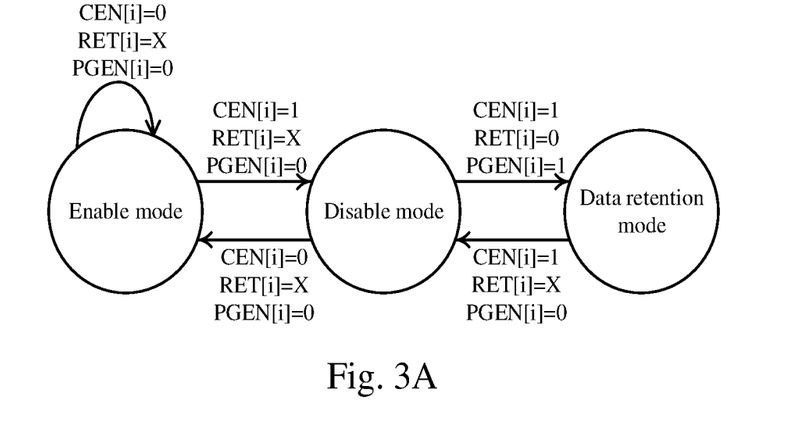
FIG. 3A is a schematic diagram illustrating a mode switching of the memory circuits in FIG. 1 or FIG. 2 according to some embodiments of the present disclosure.

In some embodiments, the buffer circuit 210, the mode control circuit 220, and the power gating circuits 230[0]-230[n] can be implemented with digital circuits, which can be configured to perform a finite state machine shown in FIG. 3A. In some embodiments, each of the power gating circuits 230[0]-230[n] can include at least one flip flop circuit and/or at least one register circuit to temporarily store and process a corresponding power gating enable signal and a corresponding status signal.

FIG. 3A is a schematic diagram illustrating a mode switching of the memory circuits 120[0]-120[n] in FIG. 1 or FIG. 2 according to some embodiments of the present disclosure. In an example of FIG. 3A, i is an integer from 0 to n, and n is a positive integer higher than or equal to 1. For example, if i is 1, the memory circuit 120[1] can switch its operating mode according to the chip enable signal CEN[1], the data retention signal RET[1], and the power gating enable signal PGEN[1]. Alternatively, if i is n, the memory circuit 120[n] can switch its operating mode according to the chip enable signal CEN[n], the data retention mode RET[n], and the power gating enable signal PGEN[n].

When both the chip enable signal CEN[i] and the power gating enable signal PGEN[i] have a first logic value (e.g., a logic value of 0) (it is noted that, under this condition, a logic value of the data retention RET[i] is a don't-care term, and is thus labeled as "X"), the memory controller 110 controls the corresponding memory circuit 120[i] to operate in the enable mode. Under this condition, the memory controller 110 can access the memory circuit 120[i]. When the chip enable signal CEN[i] has a second logic value (e.g., a logic value of 1) and the power gating enable signal PGEN[i] has the first logic value (it is noted that, under this condition, a logic value of the data retention RET[i] is a don't-care term, and is thus labeled as "X"), the memory controller 110 controls the corresponding memory circuit 120[i] to operate in the disable mode. Under this condition, the memory controller 110 cannot access the memory circuit 120[i]. When each of the chip enable signal CEN[i] and the power gating enable signal PGEN[i] has the second logic value and the data retention mode signal RET[i] has the first logic value, the memory controller 110 controls the corresponding memory circuit 120[i] to operate in the data retention mode. Under this condition, the power consumption of the memory circuit 120[i] can be reduced.

Figure 3B:
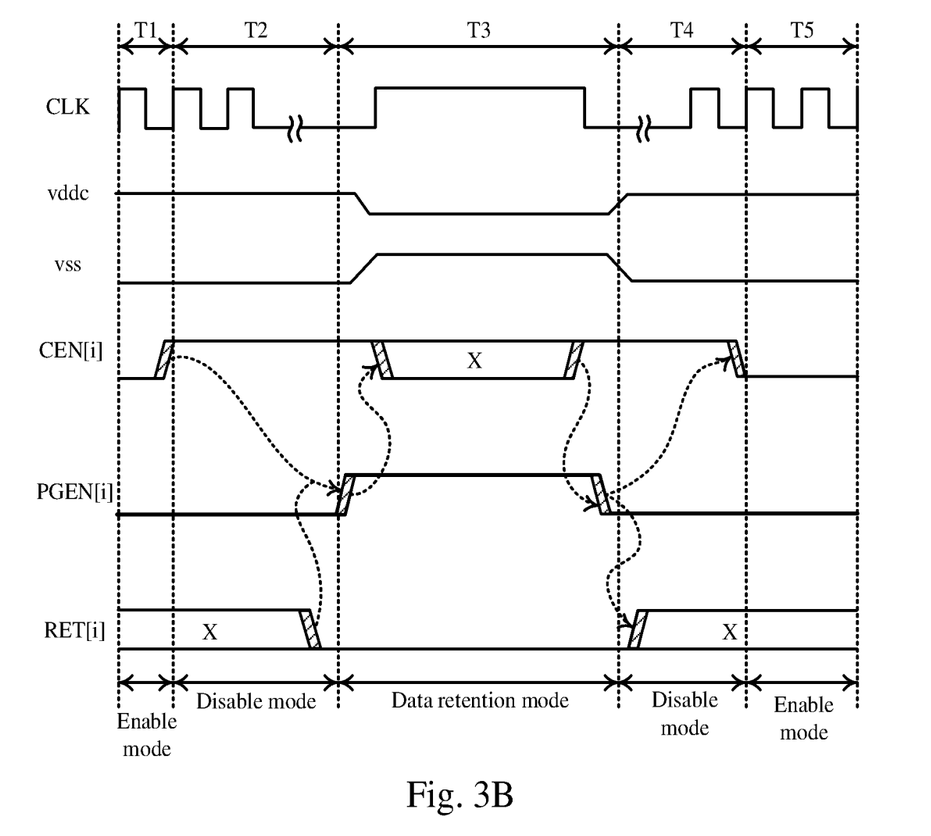
FIG. 3B is a timing diagram showing mode switching of the memory circuits in FIG. 1 according to some embodiments of the present disclosure.

FIG. 3B is a timing diagram showing mode switching of the memory circuits 120[0]-120[n] in FIG. 1 according to some embodiments of the present disclosure. As mentioned above, in some embodiments, when the memory controller 110 controls the memory circuit 120[0] to operate in the enable mode in response to the command CMD1, the memory controller 110 controls the remaining memory circuits 120[1]-120[n] to operate in the data retention mode in response to the command CMD1. In an example of FIG. 3B, i can be any number from 0 to n, in order to switch the operating mode of the memory circuit 120[$i$].

During an interval T1, when the memory controller 110 controls the memory circuit 120[$i$] to operate in the enable mode in response to the command CMD1, the memory controller 110 outputs the chip enable signal CEN[i] and the power gating enable signal PGEN[i] that have logic values of 0 (i.e., low levels). During an interval T2, as the chip enable signal CEN[i] has a logic value of 1 (i.e., a high level) and the power gating enable signal PGEN[i] has the logic value of 0, the corresponding memory circuit 120[$i$] can operate in the disable mode. During an interval T3, the memory controller 110 outputs the power gating enable signal PGEN[i] having the logic value of 1 to control the corresponding memory circuit 120[$i$] to operate in the data retention mode. Under the data retention mode, a frequency of a clock signal CLK (which is for setting read/write operations of the memory circuit 120[$i$]) can be lower, and levels of voltages vddc and vss for driving the memory circuit 120[$i$] can be adjusted to reduce power consumption.

If the circuitry 101 is going to access the memory circuit 120[$i$], the memory controller 110 generates the power gating enable signal PGEN[i] in response to the command CMD1 to start switching the memory circuit 120[$i$] to operate in the enable mode. During an interval T4, in response to the chip enable signal CEN[i] and the power gating enable signal PGEN[i], the corresponding memory circuit 120[$i$] operates in the disable mode. During an interval T5, the memory controller 110 generates the chip enable signal CEN[i] having the logic value of 0 to control the memory circuit 120[$i$] to operate in the enable mode. As a result, the circuitry 101 can access the memory circuit 120[$i$].

Figure 3C:
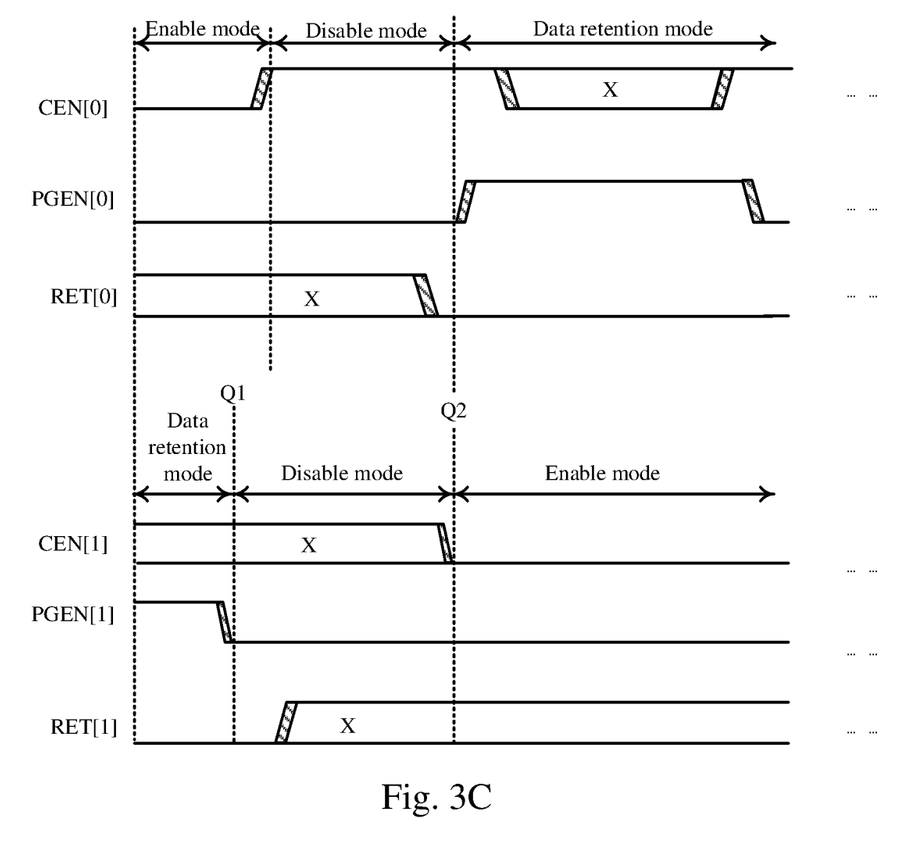
FIG. 3C is a timing diagram of mode switching of the memory circuits in FIG. 1 according to some embodiments of the present disclosure.

FIG. 3C is a timing diagram of mode switching of the memory circuits 120[0]-120[1] in FIG. 1 according to some embodiments of the present disclosure. Reference is made to both of FIG. 1 and FIG. 3C. In some embodiments, the memory circuits 120[0]-120[$n$] have successive memory addresses. For example, as shown in FIG. 1, memory addresses of the memory circuit 120[0] are from 00000000 to 00001111, and those of memory circuit 120[1] are from 00010000 to 00011111. By this analogy, it is understood the relation among the memory addresses of the memory circuits 120[0]-120[$n$]. The values about the memory addresses are given for illustrative purposes, and the present disclosure is not limited thereto.

In some embodiments, the memory controller 110 is further configured to starting waking a second circuit (e.g., the memory circuit 120[1]) in the memory circuit s 120[0]-120[$n$] before finishing an accessing operation to a first circuit in (e.g., the memory circuit [0]) in the memory circuits 120[0]-120[$n$]). In some embodiments, the first circuit and the second circuit have successive memory addresses.

For example, the circuitry 101 can be an image processor circuitry that sends the command CMD1 to sequentially write successive image data to the memory circuits 120[0]-120[$n$], in which the successive image data can be, for example, frame data in a single image frame. As shown in FIG. 3C, in response to the command CMD1, the memory controller 110 controls the memory circuit 120[0] to operate in the enable mode, and controls the memory circuit 120[1] to operate in the data retention mode. The memory controller 110 can predict whether a size of data to be written exceeds available capacity of the memory circuit 120[0] based on the command CMD1. In some embodiments, if the size of the frame data to be written exceeds the available capacity of the memory circuit 120[0], part of the frame data in the same image frame can be stored in the memory circuit 120[0], and other part of the frame data in the same image frame can be stored in the memory circuit 120[1]. The memory controller 110 can start waking up the next memory circuit 120[1] when writing the frame data to a predetermined memory address of the memory circuit 120[0]. For example, the predetermined memory address can be a z-th memory address to the last memory address of the memory circuit 120[0] (example, the memory address of "00001100" in FIG. 1), in which z is a positive integer greater than or equal to 1, and a value of z can be set by software or an input from a user. For example, z can be (but not limited to) 4. As shown in FIG. 3C, before the end of the enable mode of the memory circuit 120[0], the memory controller 110 writes data to the memory address of "00001100" of the memory circuit 120[$n$] at time Q1, in which the memory address of "00001100" is the fourth memory address to the last memory address of the memory circuit 120[0]. Therefore, the memory controller 110 can generate the power gating enable signal PGEN[1] having the logic value of 0 at time Q1 to start switching the memory circuit 120[1] from operating in the data retention mode to operating in the enable mode. As the memory circuit 120[1] is awaken early (i.e., started switching to the enable mode), the circuitry 101 is able to continuously write the image data to the next memory circuit 120[1] after accessing the memory circuit 120[0] (i.e., time Q2). As a result, the time for switching different memory circuits to be accessed can be reduced to improve an efficiency of the circuitry 101 to access the memory device 100.

Figure 4:
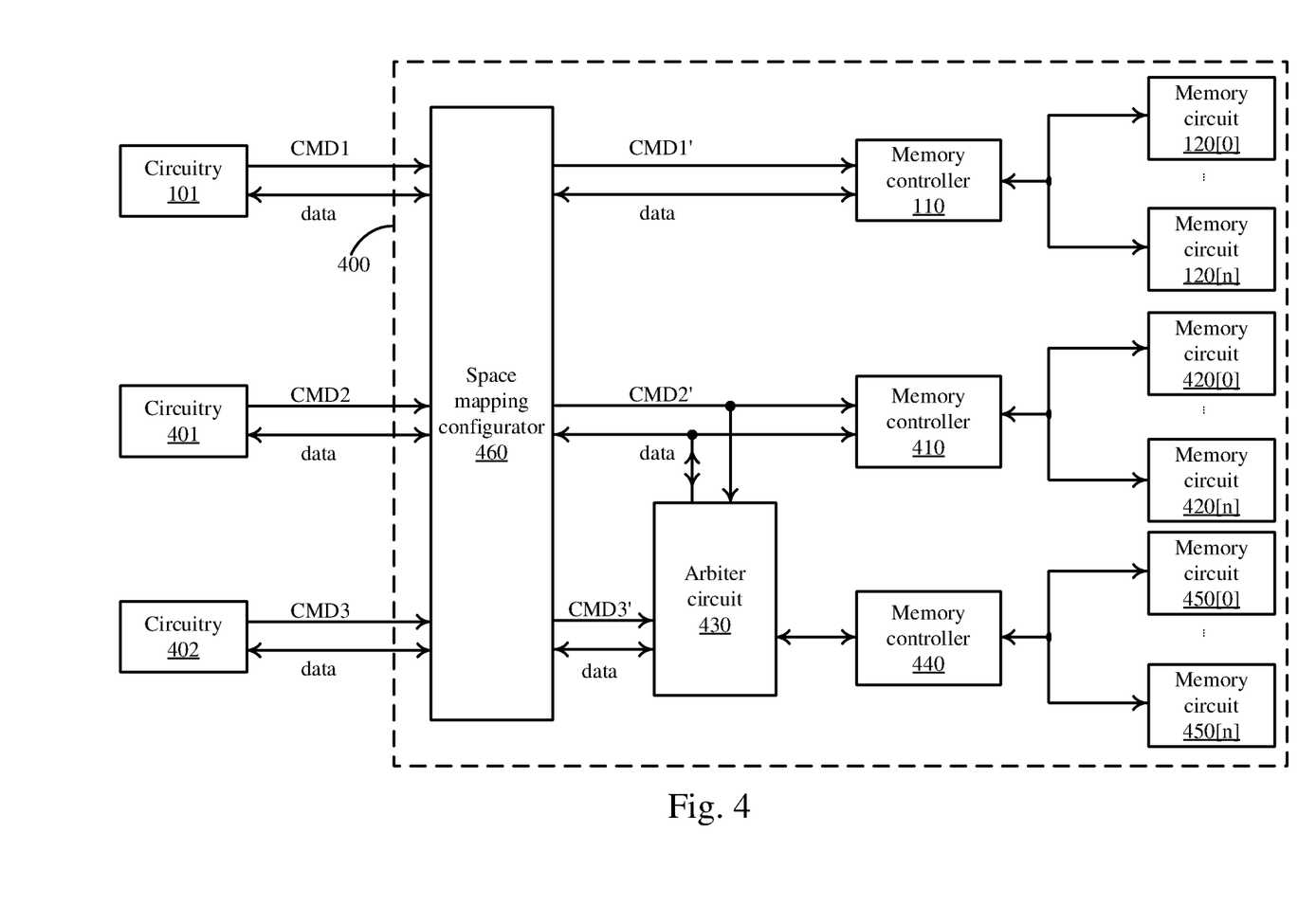
FIG. 4 is a schematic diagram of a memory device according to some embodiments of the present disclosure.

FIG. 4 is a schematic diagram of a memory device 400 according to some embodiments of the present disclosure. Compared with FIG. 1, in this example, the memory device 400 further includes a memory controller 410, a memory controller 440, memory circuits 420[0]-420[$n$], memory circuits 450[0]-450[$n$], an arbiter circuit 430, and a space mapping configurator 460. The space mapping configurator 460 assigns memory blocks to the circuitry 101, a circuitry 401, and a circuitry 402 according to boundary signals corresponding to the circuitry 101, the circuitry 401, and the circuitry 402, and maps logical memory addresses in the command CMD[i] received from each circuitry into physical memory addresses to output a command CMD[i]'. In other words, the space mapping configurator 460 is configured to assign available storage spaces to each circuitry. In this example, the space mapping configurator 460 assigns the memory circuits 120[0]-120[$n$] to the circuitry 101 according to the boundary signal(s) corresponding to the circuitry 101. The space mapping configurator 460 assigns the memory circuits 420[0]-420[$n$] and at least one circuit in the memory circuits 450[0]-450[$n$] to the circuitry 401 according to the boundary signal(s) corresponding to the circuitry 401. The space mapping configurator 460 further assigns remaining circuits in the memory circuits 450[0]-450[$n$] to the circuitry 402 according to the boundary signal(s) corresponding to the circuitry 402.

In an example, the space mapping configurator 460 can be implemented with a lookup table circuit (not shown), a mapping configuration table (not shown), and register circuits (not shown). The register circuits are configured to store the boundary signal(s) corresponding to each circuitry 401, 402, and 403. The mapping configuration table stores memory address mapping information and space configuration information. The lookup table circuit searches the mapping configuration table according to identification signal(s), the boundary signal(s), and the logical memory addresses in the command CMD[i] corresponding to each circuitry 401, 402, and 403 to output the command CMD[i]' that contains the information of physical memory addresses. In some embodiments, the boundary signal(s) corresponding to each circuitry can be adjusted correspondingly by software or other control circuit(s) according to practical requirements of each circuitry 401, 402, and 403, such that the memory spaces can be efficiently utilized.

In this example, the memory controller 110 can receive the command CMD1' and/or data from the circuitry 101 via the space mapping configurator 460 to access the memory circuits 120[0]-120[n]. The memory controller 410 is coupled to the circuitry 101 via the space mapping configurator 460 to receive a command CMD2' and/or data. The memory controller 410 generates chip enable signals (not shown), data retention signals (not shown), and power gating enable signal (not shown) in response to the command CMD2' to respectively control the memory circuits 420[0]-420[n]. The memory controller 440 can receive the command CMD2' and/or data corresponding to the circuitry 401, or receive a command CMD3' and/or data corresponding to the circuitry 402 via the arbiter circuit 430 to access the memory circuits 450[0]-450[n]. The memory controller 440 generates chip enable signals (not shown), data retention signals (not shown), and power gating enable signal (not shown) in response to the command CMD2' or the command CMD3' to respectively control the memory circuits 450[0]-450[n]. In some embodiments, arrangements of the memory controller 410 and those of the memory controller 440 are similar with those of the memory controller 110 in FIG. 2, and thus the repetitious descriptions are not given.

In this example, the circuitry 401 and the circuitry 402 share the memory controller 440 to access the memory circuits 450[0]-450[n], and the arbiter circuit 430 is configured to control the authority of the circuitry 401 and the circuitry 402 to utilize the memory controller 440. For example, when both of the circuitry 401 and the circuitry 402 are going to access the memory circuits 450[0]-450[n], the arbiter circuit 430 is configured to set the circuitry 401 and the circuitry 402 to alternately utilize the memory controller 440.

As an arbiter circuit may occupy additional circuit area, cost may be increased. In practical, the arbiter circuit is employed and arranged between the circuitries and the memory controller only on condition that when two circuitries are required to share multiple memory circuits via the same memory controller. As shown in embodiments of FIG. 4, the circuitry 101 is not required to share memory circuits with other circuitry, and thus there is no arbiter circuit arranged between the circuitry 101 and the memory controller 110.

Figure 5:
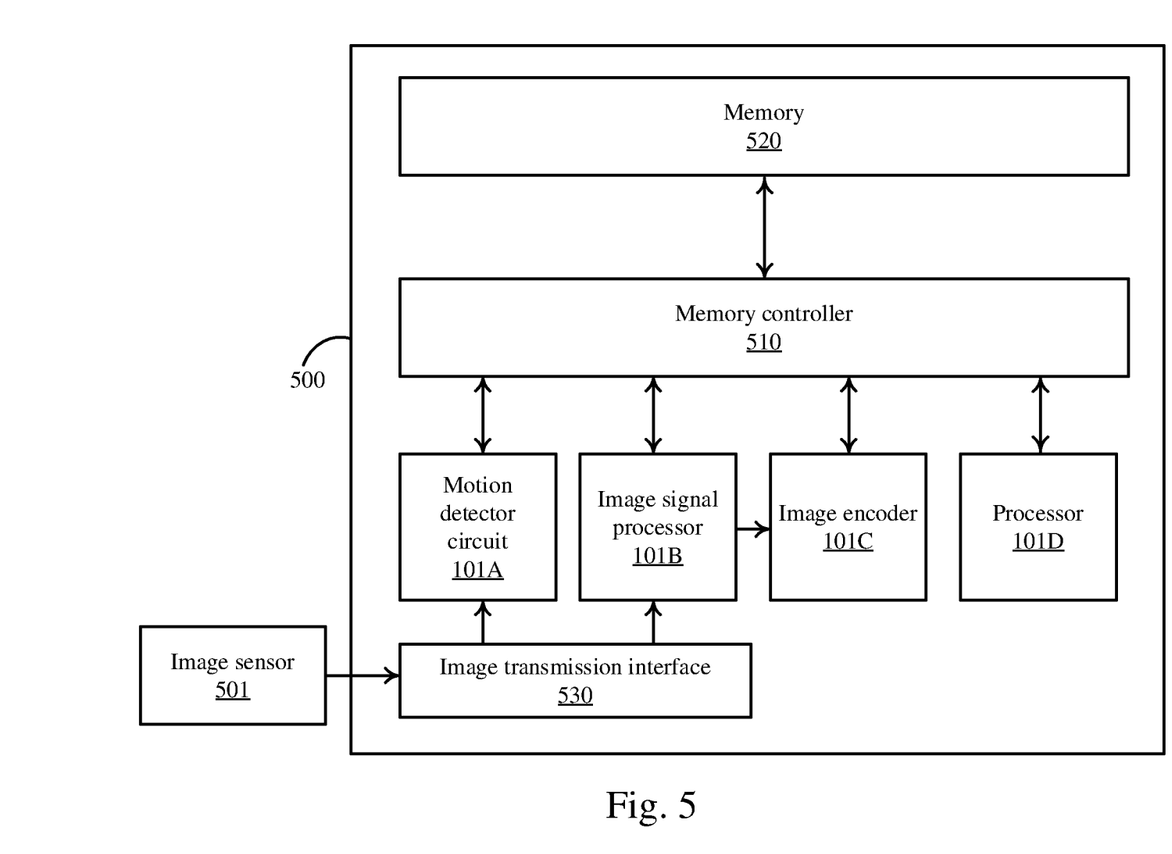
FIG. 5 is a schematic diagram of an image processing chip according to some embodiments of the present disclosure.

FIG. 5 is a schematic diagram of an image processing chip 500 according to some embodiments of the present disclosure. The image processing chip 500 includes a memory controller 510, a memory 520, a motion detector circuit 101A, an image signal processor 101B, an image encoder 101C, a processor 101D, and an image transmission interface 530. In this example, the memory controller 510 can include multiple memory controllers (e.g., the memory controller 110, the memory controller 410, and the memory controller 420 in FIG. 4), and the memory 520 can include multiple memory blocks. Each memory block can include the memory circuits 120[0]-120[n] in FIG. 1. Arrangements among those memory controllers and those memory blocks can be understood with reference to FIG. 4, and thus the repetitious descriptions are not further given.

Each of the motion detector circuit 101A, the image signal processor 101B, the image encoder 101C, and/or the processor 101D can be considered as an image processing circuit. The image processing circuit can be configured to process image data to observe (or monitor) a predetermined area. The motion detector circuit 101A, the image signal processor 101B, the image encoder 101C, and the processor 101D can receive image data from an image sensor 501 via the image transmission interface 530, and store the processed image data to the memory 520. In some embodiments, in a chip layout, a wire length between the memory 520 and each of the motion detector circuit 101A, the image signal processor 101B, the image encoder 101C, and the processor 101D can be about the same as each other. As a result, a timing difference between the memory 520 and each one of those circuits can be reduced.

Similar to the circuitry 101, the circuitry 401, or the circuitry 402 in FIG. 4, the motion detector circuit 101A, the image signal processor 101B, the image encoder 101C, and/or the processor 101D can share storage spaces of the memory 520 through the memory controller 510. In some embodiments, the memory controller 510 can include a space mapping configurator (e.g., the space mapping configurator 460 shown in FIG. 4), which is configured to assign available storage spaces to the motion detector circuit 101A, the image signal processor 101B, the image encoder 101C, and the processor 101D. For example, similar to the circuitry 101 in FIG. 4, the motion detector circuit 101A, the image signal processor 101B, the image encoder 101C, and/or the processor 101D can access a corresponding memory block in the memory 520 via respective corresponding controllers (e.g., the memory controller 110 in FIG. 4) in the memory controller 510. In some embodiments, the memory controller 510 further includes one or more arbiter circuits (e.g., the arbiter circuit 430). Similar to the circuitry 401 and the circuitry 402 in FIG. 4, the motion detector circuit 101A, the image signal processor 101B, the image encoder 101C, and/or the processor 101D can be connected to one or more memory controllers in the memory controller 510 via the arbiter circuits in the memory controller 510 to share different memory blocks in the memory 520.

In some embodiments, the memory controller 510 includes the memory controller 110, the memory controller 410 and the memory controller 440, the memory 520 includes the memory circuits 120[0]-120[n], the memory circuits 420[0]-420[n], and the memory circuits 450[0]-450 [n]. The motion detector circuit 101A can be the circuitry 101, which can access the memory circuits 120[0]-120[n] via the memory controller 110, and the image encoder 101C can be the circuitry 401, which can access the memory circuits 420[0]-420[n] via the memory controller 410. The processor 101D can be the circuitry 402, and the image encoder 101C and the processor 101D can be coupled to the memory controller 440 via the arbiter circuit 430 to access the memory circuits 450[0]-450[n]. When the motion detector circuit 101A detects whether a moving object exists in an image frame, the motion detector circuit 101A sends the command CMD1 to the memory controller 110 to access corresponding data, and the memory controller 110 can switch the operating mode of the corresponding memory block according to data to be accessed. In greater detail, when the memory controller 110 reads data of the image frame from one memory circuit (e.g., the memory circuit 120[0]) in the memory circuits 120[0]-120[n], the memory controller 110 can control that memory circuit to operate in the enable mode, and control the remaining memory circuits (e.g., the memory circuits 120[1]-120[n]) in the memory circuits 120[0]-120[n] to operate in the data retention mode to reduce the power consumption. Similarly, when the image encoder 101C writes data of an image frame, the image encoder 101C can send the command CMD2 to the memory controller 410 to write the encoded frame data to the memory circuits 420[0]-420[n]. The memory controller 410 can switch the operating mode of a corresponding memory block according to the memory address to be written. In greater detail, when the memory controller 410 writes the frame data encoded by the image encoder 101C to a memory circuit (e.g., the memory circuit 420[0]) in the memory circuits 420[0]-420[n], the memory controller 410 can control that memory circuit to operate on the enable mode, and control remaining memory circuits (e.g., the memory circuit 420[1]-420[n]) in the memory circuits 420[0]-420[n] to operate in the data detention retention mode to reduce the power consumption. In some embodiments, the motion detector circuit 101A and the image encoder 101C can operate simultaneously. When the motion detector circuit 101A receives data of an image frame from the image sensor 501 and detects whether the moving object exists in the image frame, the motion detector circuit 101A reads background data or a previous frame data corresponding to frame data from the memory circuits 120[0]-120[n] through the memory controller 110, the image encoder 101C can simultaneously encode the same frame data, and write the encoded frame data to the memory circuits 420[0]-420[n]. In such course, switching about operating mode(s) of each memory circuit 102[0]-120[n] and each of the memory circuits 420[0]-420[n] are similar to the above examples, and thus the repetitious description are thus not further given.

In the above embodiments, in response to different operating scenarios of the image processing chip 500, the allocation of the memory spaces in the memory 520 to the motion detector circuit 101A, the image signal processor 101B, the image encoder 101C, and the processor 101D can be adjusted by software, such that the allocation of the memory spaces can be optimized. For example, the image encoder 101C and the processor 101D share the memory circuit 450[0]-450[n] through the arbiter circuit 430. When the image encoder 101C operates in a first mode, the encoded frame rate has a high frame rate or a high resolution, and thus the image encoder 101C requires higher memory spaces. Under this condition, the software can set a boundary signal corresponding to the image encoder 101C and a boundary signal corresponding to the processor 101D in the space mapping configurator to allocate the memory circuits 450[0]-450[511] to the image encoder 101C, and allocate the memory circuits 450[512]-450[n] to the processor 101D. When the image encoder 101C operates in a second mode, the encoded image data has a low frame rate or a low resolution. Under this condition, the software can set the boundary signal corresponding to the image encoder 101C and the boundary signal corresponding to the processor 101D in the space mapping configurator to allocate the memory circuits 450[0]-450[127] to the image encoder 101C, and allocate the memory circuits 450[128]-450[n] to the processor 101D.

Figure 6:
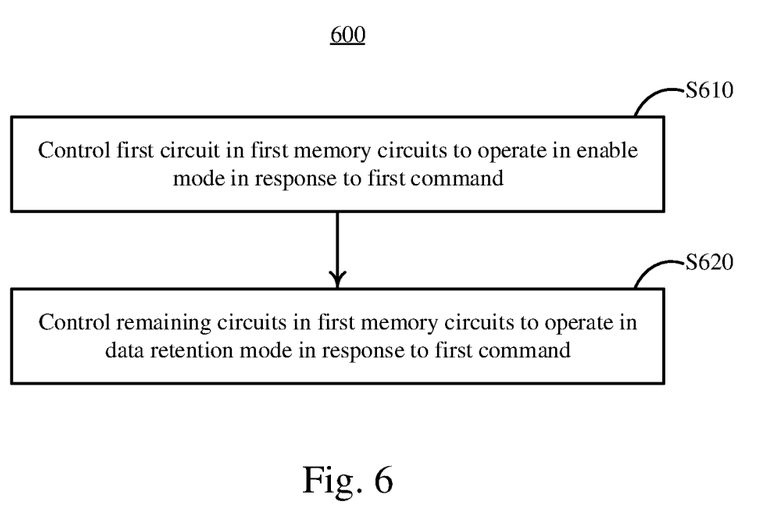
FIG. 6 is a flow chart of a memory control method according to some embodiments of the present disclosure.

FIG. 6 is a flow chart of a memory control method 600 according to some embodiments of the present disclosure. In some embodiments, the memory control method 600 can be (but not limited to) performed the memory controller 110 in FIG. 1 or FIG. 2.

In operation S610, a first circuit in first memory circuits is controlled to operate in an enable mode in response to a first command. In operation S620, remaining circuits in the first memory circuits are controlled to operate in a data retention mode in response to the first command.

Operations S610 and S620 can be understood with reference to the above embodiments, and thus the repetitious description are not further given. The above description of the memory control method 600 includes exemplary operations, but the operations of the memory control method 600 are not necessarily performed in the order described above. Operations of the memory control method 600 can be added, replaced, changed order, and/or eliminated, or the operations of memory control method 600 can be executed simultaneously or partially simultaneously as appropriate, in accordance with the spirit and scope of various embodiments of the present disclosure.

As described above, the memory device, the image processing chip, and the memory control method in some embodiments of the present disclosure are able to switch operating modes of the memory circuits when processing successive data (e.g., image data) to lower overall power consumption.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A memory device, comprising:
   a plurality of first memory circuits; and
   a first memory controller configured to receive a first command from a first circuitry, wherein when the first memory controller controls a first circuit of the first memory circuits to operate in an enable mode in response to the first command, the first memory controller is further configured to control remaining circuits of the first memory circuits to operate in a data retention mode in response to the first command,
   wherein the first memory controller comprises:
   a buffer circuit configured to receive and store the first command;
   a mode control circuit configured to generate a plurality of mode control signals in response to the first command and operating states of the first memory circuits; and
   a plurality of power gating circuits configured to control the first circuit to operate in the enable mode, and control remaining circuits of the first memory circuits to operate in the data retention mode in response to the mode control signals.

2. The memory device of claim 1, wherein before finishing an accessing operation to the first circuit, the first memory controller is further configured to start switching a second circuit of the first memory circuits from operating in the data retention mode to operating in the enable mode.

3. The memory device of claim 2, wherein the first circuit and the second circuit have successive memory addresses.

4. The memory device of claim 2, wherein when a predetermined address of the first circuit is accessed, the first memory controller starts switching the second circuit from operating in the data retention mode to operating in the enable mode.

5. The memory device of claim 2, wherein the first command is to write data of an image frame to the first memory circuits, a part of the data of the image frame is written to the first circuit, and another part of the data of the image frame is written to the second circuit.

6. The memory device of claim 1, further comprising:
a plurality of second memory circuits;
a second memory controller configured to control the second memory circuits; and
a space mapping configurator configured to assign at least one circuit in the second memory circuits to the first circuitry, and assign remaining circuits in the second memory circuits to a second circuitry according to a boundary signal.

7. The memory device of claim 6, further comprising:
an arbiter circuit configured to control an authority of the first circuitry and the second circuitry to utilize the second memory controller.

8. The memory device of claim 1, further comprising:
a plurality of third memory circuits; and
a third memory controller configured to receive a third command from a third circuitry, wherein when the third memory controller controls a third circuit in the third memory circuits to operate in the enable mode in response to the third command, the third memory controller is further configured to control remaining circuits in the third memory circuits to operate in the data retention mode in response to the third command.

9. An image processing chip, comprising:
a first image processing circuit configured to process image data;
a plurality of first memory circuits configured to store data;
a first memory controller configured to receive a first command from the first image processing circuit, and control a first circuit of the first memory circuits to operate in an enable mode in response to the first command, and control remaining circuits of the first memory circuits to operate in a data retention mode in response to the first command;
a second image processing circuit configured to process the image data;
a plurality of second memory circuits;
a second memory controller configured to control the second memory circuits; and
a space mapping configurator configured to assign at least one circuit of the second memory circuits to the first image processing circuit, and assign remaining circuits of the second memory circuits to the second image processing circuit,
wherein the space mapping configurator is configured to assign the at least one circuit of the second memory circuits to the first image processing circuit according to a boundary signal stored in a register, and the boundary signal is set by software.

10. The image processing chip of claim 9, further comprising:
a third image processing circuit configured to process the image data;
a plurality of third memory circuits; and
a third memory controller configured to receive a third command from the third image processing circuit, and control a third circuit of the third memory circuits to operate in the enable mode in response to the third command, and control remaining circuits of the third memory circuits to operate in the data retention mode in response to the third command,
wherein the image data comprise an image frame, and the first image processing circuit and the third image processing circuit process the image frame simultaneously.

11. A memory control method, comprising:
controlling a first circuit of a plurality of first memory circuits to operate in an enable mode in response to a first command from a first circuitry;
controlling remaining circuits of the first memory circuits to operate in a data retention mode in response to the first command; and
assigning at least one circuit in a plurality of second memory circuits to the first circuitry, and assigning remaining circuits of the second memory circuits to a second circuitry according to a boundary signal.

12. The memory control method of claim 11, further comprising:
starting switching a second circuit of the first memory circuits from operating in the data retention mode to operating in the enable mode before finishing an accessing operation to the first circuit.

13. The memory control method of claim 12, wherein the first circuit and the second circuit have successive memory addresses.

14. The memory control method of claim 12, wherein the first command is to write data of an image frame to the first memory circuits, a part of the data of the image frame is written to the first circuit, and another part of the data of the image frame is written to the second circuit.

* * * * *